Feb. 20, 1923.

G. E. MELLIN

IDLER FOR BELT CONVEYERS

Filed June 14, 1921

Inventor
George E. Mellin
By his Attorneys
Redding & Greeley

Patented Feb. 20, 1923.

1,446,312

UNITED STATES PATENT OFFICE.

GEORGE E. MELLIN, OF NEW YORK, N. Y.

IDLER FOR BELT CONVEYERS.

Application filed June 14, 1921. Serial No. 477,575.

*To all whom it may concern:*

Be it known that I, GEORGE E. MELLIN, a citizen of the United States, residing at Westerleigh, in the borough of Richmond, of the city of New York, in the State of New York, have invented certain new and useful Improvements in Idlers for Belt Conveyers, of which the following is a specification, reference being had to the accompanying drawing, forming a part hereof.

This invention relates generally to troughed belt conveyers and is concerned particularly with the improvement of the idler rolls and their bearings. Belt conveyers of this type as heretofore constructed have taken into account the necessity of reducing friction to a minimum and to this end it has been proposed to provide rolling contact between proximate rolls and to provide antifriction bearings for each of the rolls and end thrust bearings on which might be impressed the accumulative end thrust of all of the rolls. Such conveyers while marking advances in the art have been open to serious disadvantages in their manufacture and assembly. The machine work has been costly since great accuracy has been necessary in alining the rolls on their supporting bearings in the usual standards. In erecting the greatest care and skill has been necessary to aline the rolls with their bearings so that binding would be avoided. But in spite of the greatest care in manufacture and skill in assembling it has often happened that during use some distortion of the associated parts has resulted in great friction losses through binding and, in some cases, actual breakage. The principal object of the present invention is to overcome the objections noted to conveyers of this general type by incorporating in the rolls self-alining bearings whereby particular accuracy in machining the parts is unnecessary and proper operating alinement will be effected automatically when the parts are mounted without particular care on the part of the assembler. A degree of universal movement in the self-alining bearings is afforded so that each roll may move with respect to its own bearings in conformity with external forces impressed thereon. The degree of friction in the bearings is maintained constant regardless of the angular relation of the roll to its support.

A further object of the invention is to provide a simple inexpensive but rigid sheet metal base for the supporting standards of the rolls which base is of such form and construction that it may readily be bolted on the bed and, in turn, permit the standards to be bolted to it.

These and other objects and advantages will appear hereinafter in connection with the embodiment of the invention illustrated in the accompanying drawing, wherein—

Figure 1:
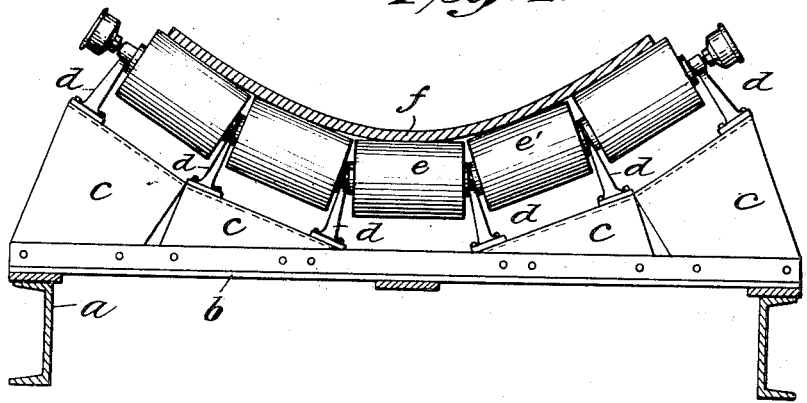
Figure 1 is a view in transverse section through a conveyer embodying the improvements.

The bed of the machine may be composed of longitudinal girders $a$ on which are supported transverse angle pieces $b$ spaced at intervals and having bolted thereto a pressed sheet metal base $c$, the general form of which is such as to give the desired troughed effect. This base is strong and rigid and yet is relatively light and lends itself to easy assembly. On the base are bolted at intervals standards $d$ which are preferably formed at their upper ends with tubular arms $d'$, $d^2$ extending generally in opposite directions and so disposed angularly as to support the proximate idler rolls $e$, $e'$, respectively, in the desired angular relation for troughing the belt $f$. The adjacent rolls, $e$, $e'$, etc., are mounted to have a rolling contact to reduce friction and to this end the supporting shafts are extended at their ends and rounded or pivoted, as at $e^2$, for rolling engagement. It will be understood that in this art reversals of parts are so well recognized as to be known equivalents. Accordingly, it is understood that such rolling contact might be effected along the peripheral edges of the rollers, or that where the rolls are carried on solid shafts the ends of the shafts might be supported in abutment. In the type of roll shown in the drawings, the so called shaft $e^3$ is tubular and has formed therewith the webs $e^4$ which carry the cylindrical section of the roll. Through each of the tubular shafts $e^3$ may extend a grease tube $g$ which communicates with the bore $d^3$ through the arms $d'$, $d^2$ of the standard $d$. Grease delivered to this bore passes to the bearings through ducts $d^4$.

Figure 2:
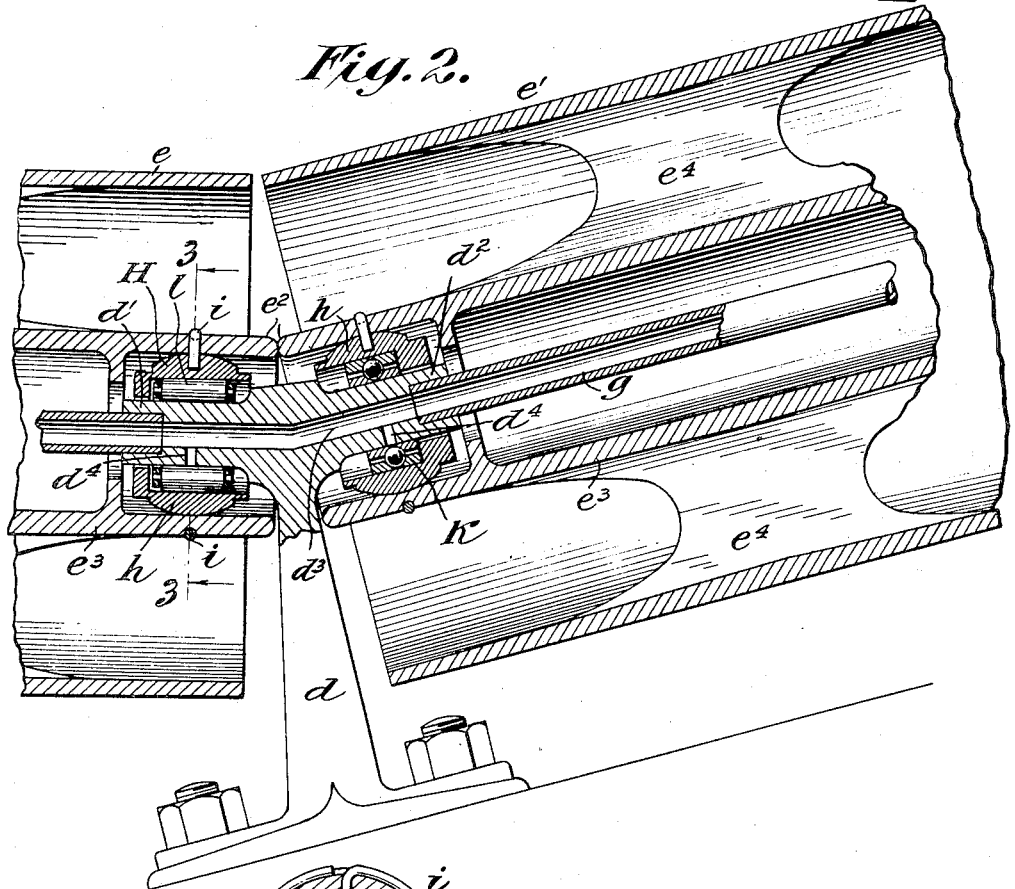
Figure 2 is a detail view in longitudinal section showing a fragment of two adjacent rolls and alternative forms of bearings therefor.
Figure 3:
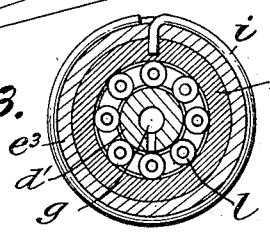
Figure 3 is a view in transverse section through one of the rolls taken through its bearings along the plane indicated by the line 3—3 of Figure 2 and looking in the direction of the arrows.

The principal feature of the invention resides in the means for mounting the rolls on the standards through self-alining bearings so that the need for accurate machine work on the parts and particular care or skill in assembling are eliminated. In carrying out this object the shaft $e^3$ has seated therein adjacent its end a generally circular bearing bush $h$, the exterior of which is of generally spherical form. The roll on the shaft $e^3$ may rock about this spherical bearing surface. The parts may be held against axial movement by means of a spring wire $i$, one end of which is bent to pass through an aperture in the tubular shaft $e^3$ and engage an alined recess in the bush $h$. The free end of this wire may extend around the tubular shaft $e^3$ and be held against displacement thereon by an annular groove in which it rests. The invention is not to be limited to the form of the bore of the bush. For instance, it might be cylindrical and bear directly on the tubular arm $d^2$ thereby affording a plane bearing for the support of the roll. On the other hand, as illustrated in Figure 2, the bore may be shouldered and afford a seat for a ball bearing $k$ which slides on to the tubular arm $d^2$. Or, as indicated in connection with the roll $e$ in Figure 2, the bush H while of the same general form as above described may be formed interiorly to afford a seat for roller bearings $l$ which are passed on to the tubular arm $d'$. The general axial position of each of the rolls $e$, $e'$, is determined by its rolling contact along the rounded edges $e^2$.

From the description given it will be evident that very careful machine work in and about the co-related elements is unnecessary since a rolling fit in a mechanical sense is not depended upon. Further, the improved construction makes it unnecessary to take into account the alinement of the various rolls with respect to the axes of their bearings. The assembling of the parts may be accomplished quickly without any special skill or care. The spherical surface on each bush $h$, H affords a seat for its roll about which universal movement within necessary limits may occur. The bush itself, of course, is held against displacement with relation to the roll by means of the retaining wire $i$. As each roll is placed on its supporting arm $d'$, $d^2$, etc., it is automatically alined by the self-alining bearing therefor. Subsequent distortion or movement of the supports for the rolls will not increase the friction in its bearing since the roll automatically conforms to any disturbing forces impressed thereon.

As indicated hereinbefore changes which affect merely the design of any of the elements or contemplate merely a reversal of parts are to be deemed within the purview of the appended claims.

I claim as my invention:

1. In a conveyer, an idler roll, supports therefor spaced apart, and a self-alining bearing interposed between the roll and each of said supports.

2. In a conveyer, a plurality of idler rolls, supporting standards interposed between proximate rolls, means to provide for rolling contact between proximate rolls, and self-alining bearings interposed between each of said rolls and its supporting standard.

3. In a belt conveyer, a plurality of idler rolls, supporting standards for proximate rolls interposed therebetween, each of said standards having oppositely extending arms, and generally cylindrical bushes surrounding said arms and interposed operatively between the arms and the rolls, respectively, and carrying means to support said rolls for universal movement about said arms.

4. In a belt conveyer, a plurality of idler rolls, supporting standards for proximate rolls interposed therebetween, each of said standards having oppositely extending arms, means for affording rolling contact between proximate rolls, and generally cylindrical bushes surrounding said arms and interposed operatively between the arms and the rolls, respectively, and carrying means to support said rolls for universal movement about said arms.

5. In a belt conveyer, an idler roll, a support therefor, a generally cylindrical bush interposed between the support and the roll and having an exterior surface of generally spherical form, and means to hold the roll and bush against relative displacement.

6. In a belt conveyer, an idler roll having a tubular shaft, a standard on which the roll is supported and having an arm extending into said shaft, a bush surrounding said arm and having a spherical exterior surface on which the tubular shaft seats, an antifriction bearing interposed between the bush and the arm, and a detachable yielding retainer engaging the tubular shaft and the bush to hold them against relative movement.

7. In a conveyer, an element to be supported rotatably, a support therefor and a self-alining bearing interposed between said element and said support and having a spherical surface engaged with one of said members for universal movement with respect thereto.

This specification signed this 11th day of June, 1921.

GEORGE E. MELLIN.